United States Patent
Wang et al.

(10) Patent No.: US 12,300,844 B2
(45) Date of Patent: May 13, 2025

(54) BATTERY MODULE

(71) Applicant: Jiangsu Contemporary Amperex Technology Limited, Jiangsu (CN)

(72) Inventors: Yuwen Wang, Jiangsu (CN); Kai Yang, Jiangsu (CN); Guangliang Lin, Jiangsu (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 673 days.

(21) Appl. No.: 16/488,700

(22) PCT Filed: Jul. 9, 2019

(86) PCT No.: PCT/CN2019/095252
§ 371 (c)(1),
(2) Date: Aug. 26, 2019

(87) PCT Pub. No.: WO2021/000336
PCT Pub. Date: Jan. 7, 2021

(65) Prior Publication Data
US 2021/0359370 A1  Nov. 18, 2021

(30) Foreign Application Priority Data
Jul. 4, 2019 (CN) .......................... 201921040744.0

(51) Int. Cl.
*H01M 50/291* (2021.01)
*H01M 4/13* (2010.01)
(Continued)

(52) U.S. Cl.
CPC ........... *H01M 50/291* (2021.01); *H01M 4/13* (2013.01); *H01M 10/052* (2013.01);
(Continued)

(58) Field of Classification Search
CPC .. H01M 4/13; H01M 10/052; H01M 10/0585; H01M 50/105; H01M 50/107;
(Continued)

(56) References Cited

U.S. PATENT DOCUMENTS

2013/0017425 A1   1/2013  Watanabe et al.
2013/0071718 A1*  3/2013  Cho ................... H01M 10/6555
                                                              429/120
(Continued)

FOREIGN PATENT DOCUMENTS

CN   206541873 U   10/2017
CN   109411651 A    3/2019
(Continued)

OTHER PUBLICATIONS

Author: Mikiya Kurita, Title: "Power storage device and power storage device module", Date: Apr. 13, 2022 retrieved from https://worldwide.espacenet.com/ (Year: 2019).*

(Continued)

*Primary Examiner* — Ekandra S. Miller-Cruz
*Assistant Examiner* — Jared Hansen
(74) *Attorney, Agent, or Firm* — East IP P.C.

(57) ABSTRACT

The disclosure provides a battery module, including: two or more battery units, wherein each battery unit includes a battery core including two end portions opposed in a length direction thereof, and the two or more battery units are arranged side by side in a thickness direction of the battery core, in two adjacent battery units, a first gap is formed between two battery cores that are close to each other, and the first gap extends from one of the two end portions along the length direction, and in a direction from the two end portions to a center of the battery core, a dimension of the first gap gradually decreases along the thickness direction; and a cushion pad which is provided between the two (Continued)

adjacent battery units, and the cushion pad is disposed in the first gap and is in contact with the end portion(s) of the battery core.

6 Claims, 16 Drawing Sheets

(51) Int. Cl.
    *H01M 10/052*     (2010.01)
    *H01M 10/0585*     (2010.01)
    *H01M 50/211*     (2021.01)
    *H01M 50/213*     (2021.01)

(52) U.S. Cl.
    CPC ..... *H01M 10/0585* (2013.01); *H01M 50/211* (2021.01); *H01M 50/213* (2021.01)

(58) Field of Classification Search
    CPC ............. H01M 50/124; H01M 50/136; H01M 50/211; H01M 50/213; H01M 50/291; H01M 50/293; Y02E 60/10; Y02P 70/50
    See application file for complete search history.

(56) References Cited

U.S. PATENT DOCUMENTS

| | | | | |
|---|---|---|---|---|
| 2014/0113171 | A1* | 4/2014 | Schaefer | H01M 10/6555 165/185 |
| 2016/0056439 | A1 | 2/2016 | Subramanian et al. | |
| 2016/0093854 | A1* | 3/2016 | Tyler | H01M 50/209 429/179 |
| 2017/0069887 | A1* | 3/2017 | Lee | H01M 10/6555 |
| 2017/0084899 | A1* | 3/2017 | Deng | H01M 50/569 |
| 2017/0237112 | A1* | 8/2017 | Holman | H01M 10/0481 429/120 |
| 2018/0034118 | A1* | 2/2018 | Jin | H01M 10/6555 |
| 2018/0254535 | A1* | 9/2018 | Kim | C08L 83/04 |
| 2019/0027797 | A1* | 1/2019 | Paramasivam | H01M 6/5038 |
| 2022/0037714 | A1* | 2/2022 | Lee | H01M 10/613 |

FOREIGN PATENT DOCUMENTS

| | | |
|---|---|---|
| CN | 109428024 A | 3/2019 |
| JP | 2000223096 A | 8/2000 |
| JP | 2016143515 A * | 8/2016 |

OTHER PUBLICATIONS

The First Office Action for Europe Application No. 19756082.4, dated Sep. 1, 2021, 5 pages.
The International Search Report for PCT/CN2019/095252, dated Apr. 10, 2020, 8 pages.
The extended European Search Report for European Application No. 19756082.4, dated Feb. 3, 2021, 7 pages.
The Second Office Action for Europe Application No. 19756082.4, dated Feb. 18, 2022, 4 pages.

* cited by examiner

BATTERY MODULE

CROSS-REFERENCE TO RELATED APPLICATION

This application is a National Stage of International Application No. PCT/CN2019/095252, filed on Jul. 9, 2019, which claims priority to Chinese Patent Application No. 201921040744.0, filed on Jul. 4, 2019, both of which are incorporated herein by reference in their entireties.

TECHNICAL FIELD

The disclosure relates to the technical field of battery, and in particular to a battery module.

BACKGROUND

With development of science and technology, secondary batteries becomes applicable more widely. For example, secondary batteries can be applied into the field of electric vehicles, energy storage or the like. The battery module includes a housing and a plurality of battery units disposed within the housing. Each battery unit includes a battery core. The battery core includes an electrode assembly and a package that covers the electrode assembly. The battery core has two end portions opposite to each other. The electrode assembly has a first electrode plate and a second electrode plate that have opposite polarities. The electrode assembly may be formed by stacking the first electrode plate, the second electrode plate, and the diaphragm together or spirally winding them together around the winding axis. After the first electrode plate and the second electrode plate are subjected to cold pressing treatment, the thickness of each of the first electrode plate and the second electrode plate close to the edge is smaller than the thickness of the central region thereof. Therefore, the gap between the first electrode plate and the second electrode plate of the electrode assembly at the end portions of the battery core becomes larger, and is larger than the gap between the first electrode plate and the second electrode plate in the central region of the battery core. Therefore, the phenomenon of lithium deposition may easily occur at the end portions of the battery core, which affects the cycle performance of the battery core.

SUMMARY

The embodiment of the disclosure provides a battery module, which can effectively reduce the gap between the first electrode plate and the second electrode plate through the cushion pad, thereby reducing the possibility of occurrence of lithium deposition at the end portions of the battery core, and improving the overall cycle performance of the battery module.

In one aspect, an embodiment of the disclosure provides a battery module, including: two or more battery units, wherein each battery unit includes a battery core including two end portions opposed in a length direction thereof, and the two or more battery units are arranged side by side in a thickness direction of the battery core, in two adjacent battery units, a first gap is formed between two battery cores that are close to each other, and the first gap extends from one of the two end portions along the length direction, and in a direction from the two end portions to a center of the battery core, a dimension of the first gap gradually decreases along the thickness direction; and a cushion pad, wherein the cushion pad is provided between the two adjacent battery units, and the cushion pad is disposed in the first gap and is in contact with the end portion(s) of the battery core.

According to an aspect of the embodiment of the disclosure, the first gap penetrates through in the length direction, the cushion pad includes a first cushion portion and a second cushion portion; and in the thickness direction, one of the two end portions of the battery core is arranged mutually with the first cushion portion, and the other of the two end portions is arranged mutually with the second cushion portion.

According to an aspect of the embodiment of the disclosure, the cushion pad further includes an intermediate portion which is disposed between the first cushion portion and the second cushion portion and in contact with the battery core.

According to an aspect of the embodiment of the disclosure, respective surfaces of the first cushion portion, the second cushion portion, and the intermediate portion facing the battery core are connected to each other and are in smooth transition; and/or a surface of the battery core where the first gap is formed is arched, and respective surfaces of the first cushion portion, the second cushion portion, and the intermediate portion facing the battery core fit the battery core.

According to an aspect of the embodiment of the disclosure, the first cushion portion, the second cushion portion, and the intermediate portion are of an integral structure.

According to an aspect of the embodiment of the disclosure, an end face of the first cushion portion is aligned with an end face of the battery core in the length direction, and/or, an end face of the second cushion portion is aligned with the end face of the battery core in the length direction.

According to an aspect of the embodiment of the disclosure, in the length direction, a ratio of a dimension of the first cushion portion to a dimension of the battery core is 0.06 to 0.15, and/or a ratio of a dimension of the first cushion portion to the dimension of the battery core is 0.06 to 0.15; or in a width direction of the battery core, the cushion pad has same dimension as the battery core According to an aspect of the embodiment of the disclosure, the battery core includes an electrode assembly and a package, the electrode assembly is disposed in the package, and the electrode assembly includes a first electrode plate and a second electrode plate that have opposite polarities, the thickness of the first electrode plate and the second electrode plate gradually increases in the direction from the two end portions to the center of the battery core.

According to an aspect of the embodiment of the disclosure, the battery module further includes a housing within which the two or more battery units are disposed, a second gap is formed between the battery core in the two or more battery units adjacent to the housing and the housing, in the direction from the two end portions to the center of the battery core, a dimension of the second gap in the thickness direction gradually decreases, and the cushion pad is disposed in the second gap and is in contact with the end portion(s) of the battery core.

According to an aspect of the embodiment of the disclosure, the two or more battery units include two or more battery cores, and a rigid isolation member is disposed between two adjacent battery cores.

The battery module according to the embodiment of the disclosure includes two or more battery units and the cushion pad disposed between two adjacent battery units. The cushion pad is disposed between the two battery units in the thickness direction. In the two adjacent battery units, a first gap is formed between two battery cores that are close to each other. The cushion pad is disposed in the first gap and is in contact with the end portion(s) of the battery core. The cushion pad provides supporting stress for the end portions of the battery core, thereby effectively reducing the gap between the first electrode plate and the second electrode plate, reducing the possibility of occurrence of lithium deposition at the end portions of the battery core, and improving the overall cycle performance of the battery module.

BRIEF DESCRIPTION OF THE DRAWINGS

Features, advantages, and technical effects of the exemplary embodiments of the disclosure will be described below with reference to the accompanying drawings.

Figure 1:
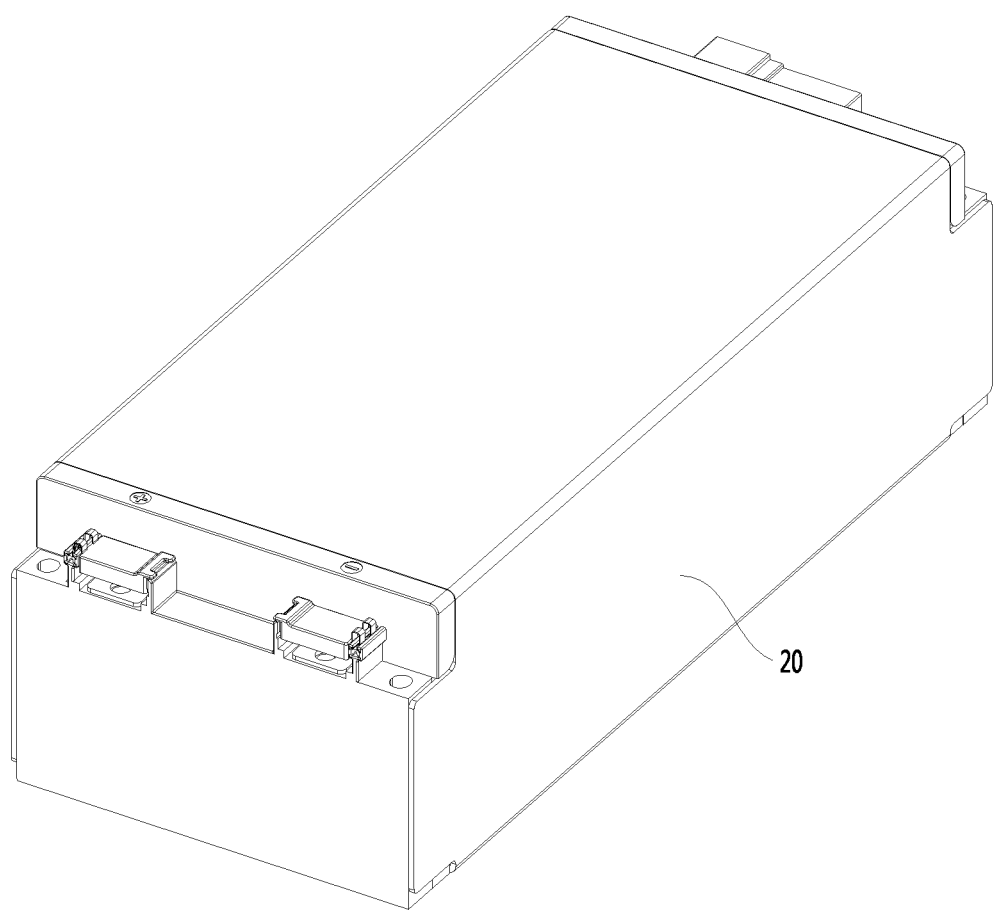
FIG. 1 is a schematic view showing the overall structure of a battery module according to an embodiment of the disclosure.

In the drawings, the drawings are not necessarily to scale.

DESCRIPTION OF REFERENCE SIGNS

| 10   | battery module          | 20   | housing                      |
|------|-------------------------|------|------------------------------|
| 30   | battery unit            | 31   | battery core                 |
| 31a  | end portion             | 31b  | end face                     |
| 32   | first gap               | 33   | second gap                   |
| 34   | electrode assembly      | 34a  | first electrode plate        |
| 34aa | first current collector | 34ab | first active material layer  |
| 34b  | diaphragm               | 34c  | second electrode plate       |
| 34ca | second current collector| 34cb | second active material layer |
| 35   | package                 | 40   | cushion pad                  |
| 41   | first cushion portion   | 42   | second cushion portion       |
| 43   | intermediate portion    | 50   | rigid isolation component    |
| X    | length direction        | Y    | thickness direction          |
| Z    | width direction.        |      |                              |

DETAILED DESCRIPTION

Embodiments of the disclosure will be further described in detail below in conjunction with the accompanying drawings and embodiments. The detailed description of the embodiments and the accompanying drawings are intended to illustrate the principle of the disclosure but are not intended to limit the scope of the disclosure, i.e., the disclosure is not limited to the described embodiments.

In the description of the disclosure, it should be appreciated that, unless otherwise stated, the meaning of "plurality" is two or more; the orientation or positional relationship indicated by the terms "upper", "lower" "left", "right", "inside", "outside" or like is merely for purpose of description of the disclosure and for simplification of the description, and are not intended to indicate or intend that the involved device or element must have specific orientation, or must be configured and operated in a specific orientation, and therefore, should not to be construed as a limitation to the disclosure. Moreover, the terms "first", "second", and the like are only used for the purpose of description, and should not to be construed as indicating or implying relative importance.

In the description of the disclosure, it should be also appreciated that, unless otherwise stated, the terms "mount", "connect with", and "connect to" are to be understood broadly, for example, they may be referred to as fixed connection or detachable connection or integral connection; or, they may be referred to as direct connection or indirect connection through an intermediate medium. The specific meaning of the above terms in the disclosure may be understood by the skilled in the art based on the specific situation.

In order for better understanding of the disclosure, the embodiments of the disclosure are described below with reference to FIGS. 1 to 19.

Figure 2:
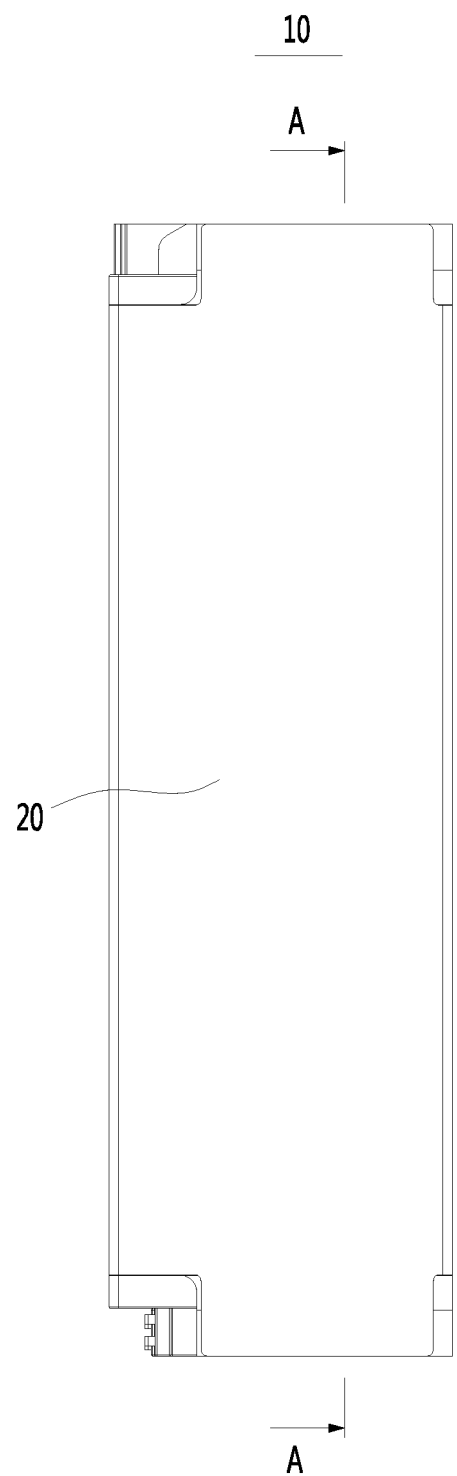
FIG. 2 is a schematic side view showing the overall structure of a battery module according to an embodiment of the disclosure.
Figure 3:
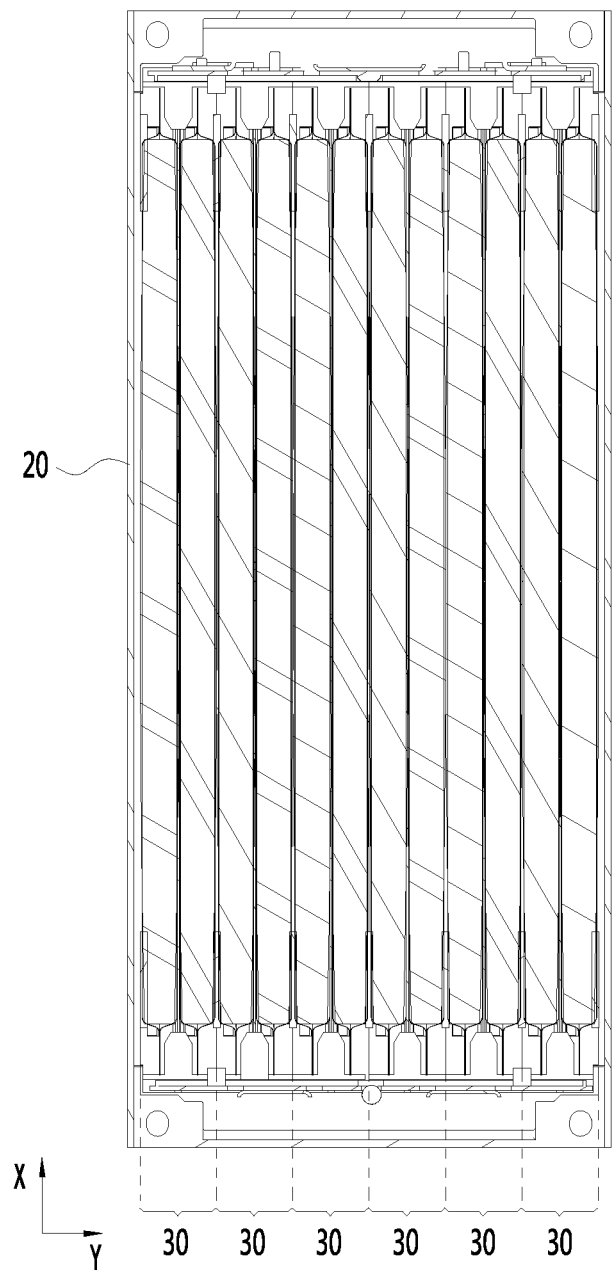
FIG. 3 is a cross-sectional structural view taken along line A-A of FIG. 2.

As shown in FIGS. 1 to 3, the battery module 10 according to the embodiment of the disclosure includes a housing 20, two or more battery units 30 and a cushion pad 40 disposed within the housing 20.

The housing 20 has an accommodation space for accommodating the battery units 30. The housing 20 can protect the battery units 30. The battery unit 30 includes a battery core 31 and a fixing frame (not shown). The battery core 31 is connected to a fixed frame. The fixing frame is advantageous for improving the overall structural strength of the battery module 10.

Figure 4:
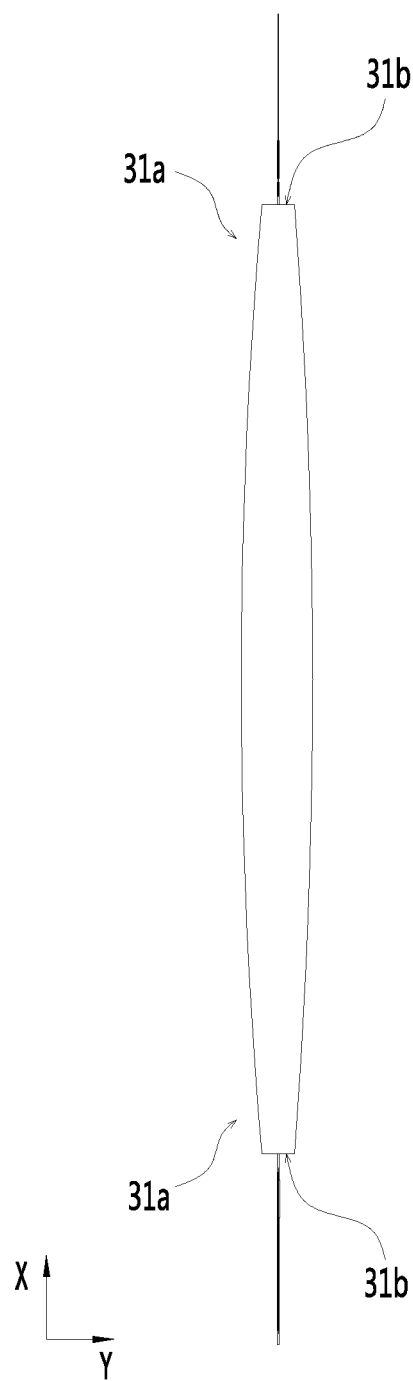
FIG. 4 is a schematic side view showing the structure of a battery core according to an embodiment of the disclosure.
Figure 5:
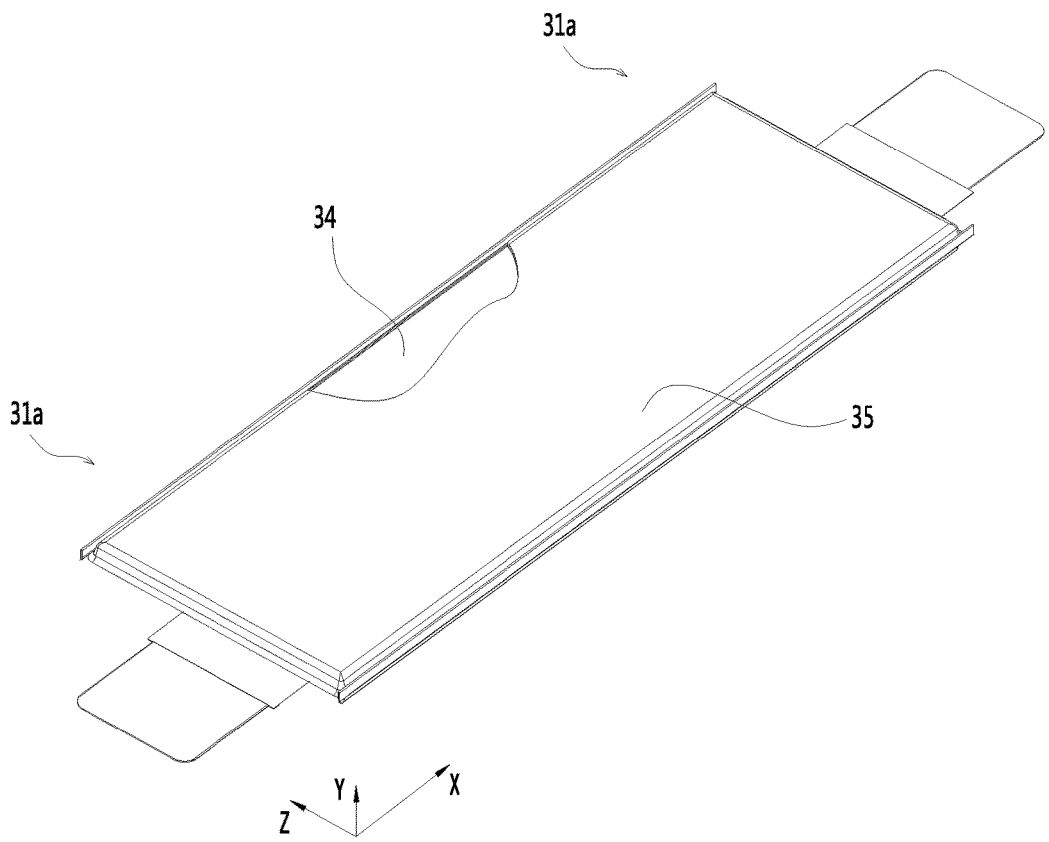
FIG. 5 is a schematic view showing the structure of a battery core according to an embodiment of the disclosure.

Referring to FIGS. 4 and 5, the battery core 31 according to the present embodiment has a substantially flat structure as a whole, and has a predetermined thickness, a predetermined length, and a predetermined width. The battery core 31 includes two end portions 31a that are opposed in the length direction X thereof. Each of the end portions 31a has an end face 31b. The end portion 31a of the battery core 31 is thinner and flatter than the central region of the battery core 31. The battery core 31 includes an electrode assembly 34 and a package 35. The package 35 has a receiving space, within which the main body of the electrode assembly 34 is received. The package 35 may be a soft casing. Alternatively, the package 35 may be manufactured by processing aluminum plastic film and steel plastic film. In the electrode assembly according to the present embodiment, the main body thereof may be formed by stacking the first electrode plate, the second electrode plate, and the diaphragm together or by spirally winding the first electrode plate, the second electrode plate, and the diaphragm together around the winding axis, wherein the diaphragm is an insulator interposed between the first electrode plate and the second electrode plate. In the present embodiment, the first electrode plate is exemplified as a positive electrode plate, while the second electrode plate is a negative electrode plate. Similarly, in other embodiments, the first electrode plate may also be a negative electrode plate, while the second electrode plate may also be a positive electrode plate. Further, the active material of the positive electrode plate is coated onto the coated region of the positive electrode plate, and the active material of the negative electrode plate is coated onto the coated region of the negative electrode plate. The uncoated region extending from the coated region of the main body functions as a tab. The electrode assembly includes two tabs, i.e., a positive tab and a negative tab, wherein the positive tab extends from the coated region of the positive electrode plate, and the negative tab extends from the coated region of the negative electrode plate.

Figure 6:
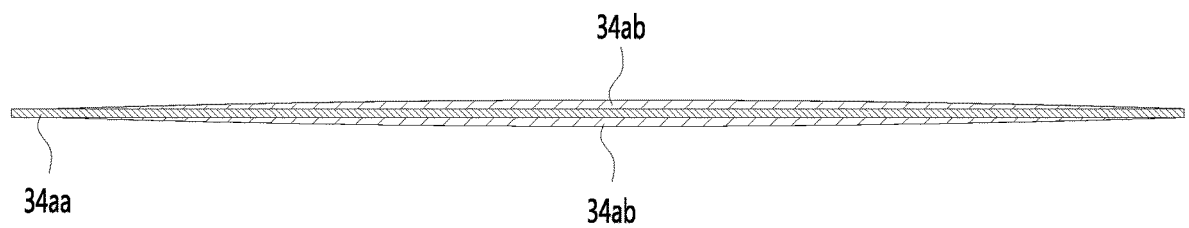
FIG. 6 is a schematic cross-sectional view showing the structure of a first electrode plate according to an embodiment of the disclosure.
Figure 7:
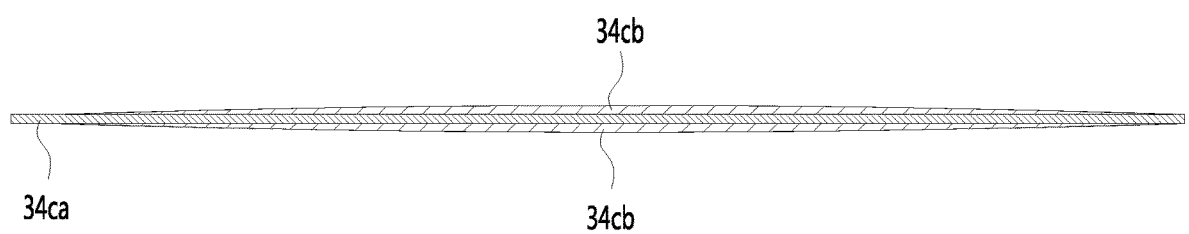
FIG. 7 is a schematic cross-sectional view showing the structure of a second electrode plate according to an embodiment of the disclosure.
Figure 8:
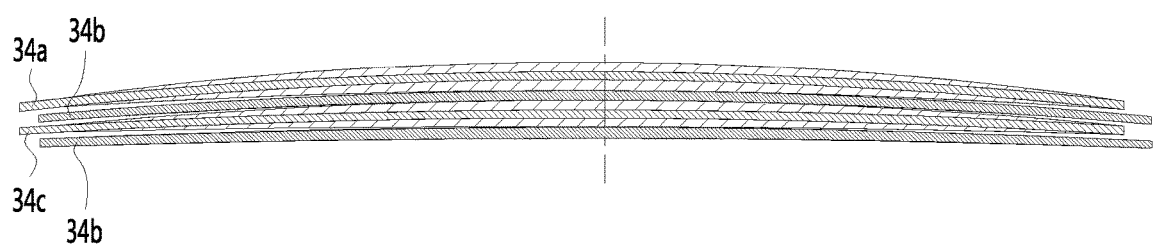
FIG. 8 is a schematic cross-sectional view showing a partial laminated structure of a first electrode plate, a diaphragm, and a second electrode plate included in a battery core according to an embodiment of the disclosure.

Referring to FIGS. 6 and 7, the first electrode plate 34a includes a first current collector 34aa and first active material layers 34ab. The second electrode plate 34c includes a second current collector 34ca and second active material layers 34cb. Since the first electrode plate 34a and the second electrode plate 34c require to be subjected to cold pressing treatment during processing, the thickness of the cold-pressed first electrode plate 34a and the second electrode plate 34c as a whole gradually increases in a direction from the end portions 31a of the battery core 31 to the center of the battery core 31, so that the electrode assembly 34 according to the present embodiment, which is formed by stacking or winding the first electrode plate 34a, the second electrode plate 34c, and the diaphragm 34b together, has a structure in which the thickness of both ends thereof is smaller than the thickness of the center thereof, and in turn, so that the battery core 31 as a whole also has a structure in which the thickness of both ends thereof is smaller than the thickness of the center thereof (see FIG. 4). Referring to FIG. 8, after the first electrode plate 34a and the second electrode plate 34c form the electrode assembly 34, the gap of each of the first electrode plate 34a and the second electrode plate 34c at the end portion 31a of the battery core 31 becomes large, and is larger than the gap of each of the first electrode plate 34a and the second electrode plate 34c in the central region of the battery core 31.

The two or more battery units 30 are arranged side by side in the thickness direction Y of the battery core 31. In the two adjacent battery units 30, the battery core 31 of one battery unit 30 and the battery core 31 of the other battery unit 30 are close to each other and disposed opposite to each other. A first gap 32 is formed between the two battery cores 31 that are close to each other. The first gap 32 extends from end portions 31a in the length direction X. In the direction from the end portions 31a of the battery core 31 to the center of the battery core 31, the dimension of the first gap 32 in the thickness direction Y gradually decreases. That is to say, in the direction from the end portions 31a of the battery core 31 to the center of the battery core 31, the dimension of the first gap 32 in the thickness direction Y is narrowed. The cushion pad 40 is disposed between two adjacent battery units 30. The cushion pad 40 is disposed in the first gap 32 and is in contact with the end portion 31a of the battery core 31. The end portion 31a of the battery core 31 is at least partially covered by the cushion pad 40. The battery core 31 has two wide faces in the thickness direction Y. The battery core 31 has two narrow faces in the width direction Z. The wide faces of one battery core 31 of the two adjacent battery cores 31 is disposed corresponding to the wide faces of the other battery core 31 of the two adjacent battery cores 31. The region where the first gap 32 is formed on the wide face of the battery core 31 is curved. The cushion pad 40 is elastic. Alternatively, the cushion pad 40 may adopt a buffering material such as silica gel or polyurethane.

The battery module 10 according to the present embodiment of the disclosure includes two or more battery units 30 and cushion pad 40 disposed between two adjacent battery units 30. In the thickness direction Y, the cushion pad 40 is disposed between the two battery units 30. In the two adjacent battery units 30, the first gap 32 is formed between the two battery cores 31 that are close to each other. The cushion pad 40 is disposed in the first gap 32 and is in contact with the end portion 31a of the battery core 31. The cushion pad 40 can provide a supporting stress for the end portion 31a of the battery core 31, so that the gap between the first electrode plate 34a and the second electrode plate 34c at the end portion 31a of the battery core 31 can be effectively reduced, the possibility of occurrence of a lithium deposition phenomenon at the end portion 31a of the battery core 31 can be lowered, and the overall cycle performance of the battery module 10 can be improved.

Further, during the cycle of the battery core 31, the battery core 31 as a whole expands, and the expanded end portion 31a of the battery core 31 may apply a pressing force to the cushion pad 40. When the cushion pad 40 is extruded and pressed simultaneously by the battery cores 31 disposed on the both sides thereof, the cushion pad 40 may apply a reaction force to the battery core 31 to avoid a large degree of expansion of the end portion 31a of the battery core 31, thereby ensuring that the degree of expansion of the end portion 31a of the battery core 31 tends to coincide with the degree of expansion of the central region of the battery core 31. In this way, by providing the cushion pad 40 between the battery units 30, it can effectively restrain the expansion of the end portion 31a, thereby reducing the possibility of occurrence of lithium deposition caused by excessive expansion of the end portion 31a, reducing the possibility of structural damage such as cracks in the first electrode plate 34a and/or the second electrode plate 34c due to mutual pressing of the two adjacent battery cores 31, and effectively improving the overall cycle performance of the battery module 10.

In one embodiment, in the direction from the end portions 31*a* of the battery core 31 to the center of the battery core 31, the thickness of the cushion pad 40 gradually decreases so as to fit the first gap 32.

Figure 9:
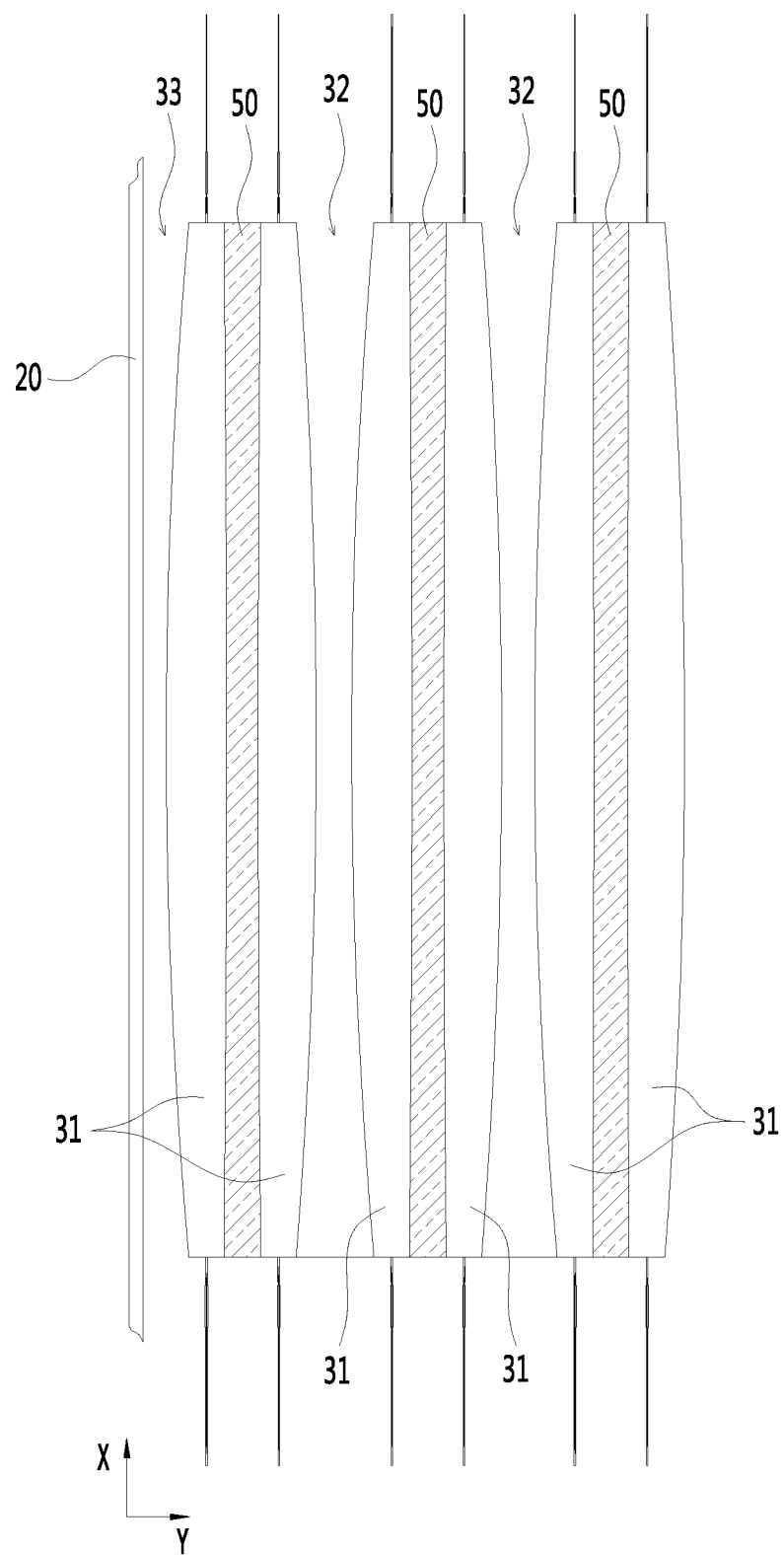
FIG. 9 is a schematic partial view showing arrangement of the battery units in a battery module according to an embodiment of the disclosure.
Figure 10:
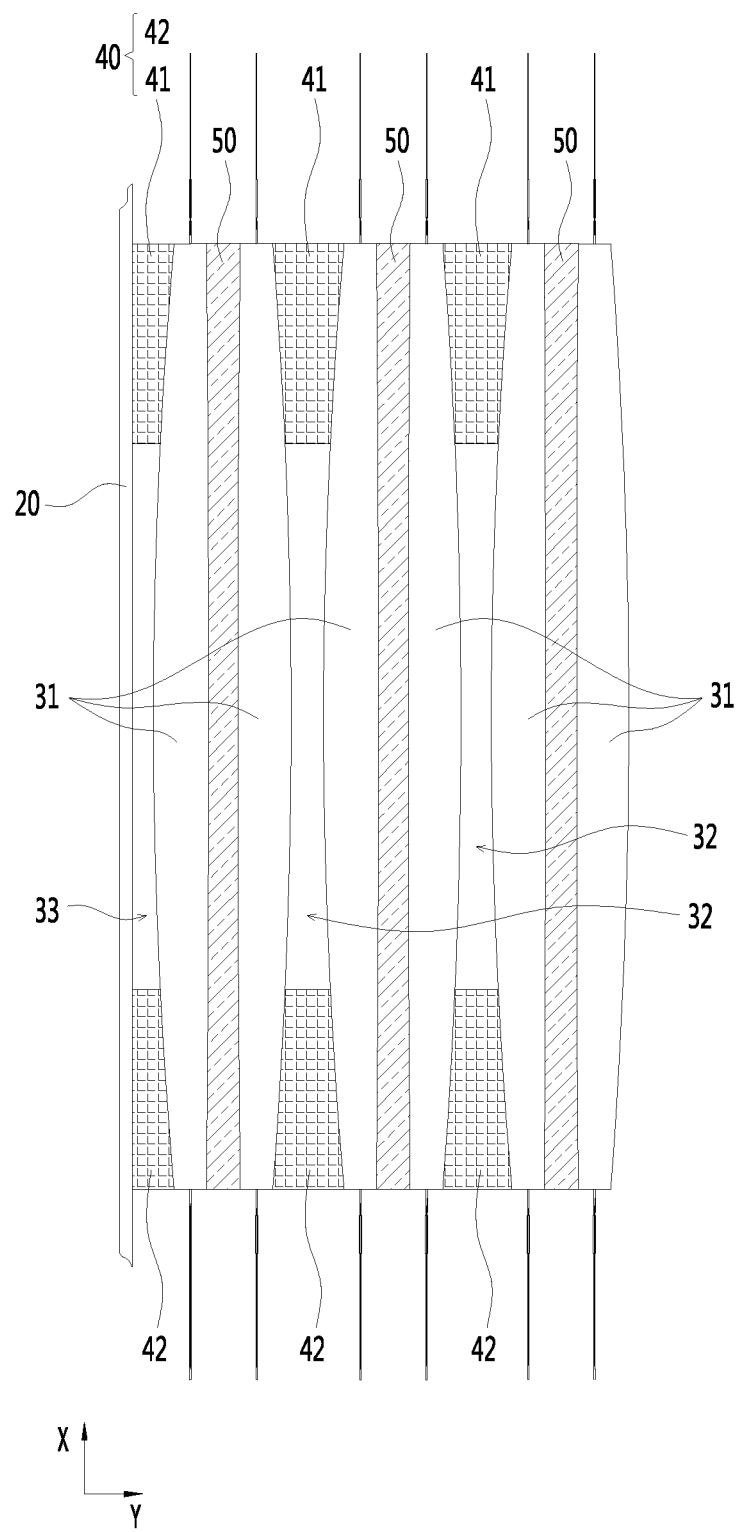
FIG. 10 is a schematic structural view showing a cushion pad disposed between the battery units in a battery module according to an embodiment of the disclosure.

In one embodiment, referring to FIG. 9, the battery module 10 includes two or more battery units 30. Each battery unit 30 includes two battery cores 31. The first gap 32 is formed between the two battery cores 31 that are close to each other in the two adjacent battery units 30. The first gap 32 penetrates through in the length direction X. Referring to FIG. 10, the cushion pad 40 includes a first cushion portion 41 and a second cushion portion 42. In the thickness direction Y, one of the two end portions 31*a* of the battery core 31 is arranged mutually with the first cushion portion 41, and the other of the two end portions 31*a* is arranged mutually with the second cushion portion 42. The first cushion portion 41 and the second cushion portion 42 are disposed at the two end portions 31*a* of the battery core 31, respectively. The first cushion portion 41 and the second cushion portion 42 are spaced apart from each other. The first cushion portion 41 and the second cushion portion 42 respectively provide a supporting stress for the two end portions 31*a* of the battery core 31, so that the gap between the first electrode plate 34*a* and the second electrode plate 34*c* at the end portion 31*a* of the battery core 31 can be effectively reduced. When the battery core 31 is expanded and deformed, the first cushion portion 41 and the second cushion portion 42 respectively apply a restraining stress and provide a buffering effect to the two end portions 31*a* of the battery core 31 to reduce the degree of expansion and deformation of the end portion 31*a* of the battery core 31, such that the degree of expansion of the end portion 31*a* of the battery core 31 tends to coincide with the degree of expansion of the central region of the battery core 31. The surface of each of the first cushion portion 41 and the second cushion portion 42 facing the battery core 31 is shaped to match the surface of the battery core 31. Alternatively, the first cushion portion 41 and the second cushion portion 42 are both solid structural bodies.

In one embodiment, the wide faces of the battery core 31 are arched. The surface of the first cushion portion 41 facing the battery core 31 and the surface of the second cushion portion 42 facing the battery core 31 are also arched, so as to be shaped to fit the wide surfaces of the battery core 31. In the length direction X, the first cushion portion 41 has an end face facing outward and away from the second cushion portion 42, and the second cushion portion 42 has an end face facing outward and away from the first cushion portion 41. The end face of the first cushion portion 41 is aligned with the end face 31*b* of the battery core 31 in the length direction X, so that the end portion 31*a* disposed opposite to the first cushion portion 41 does not appeared to be suspended, and therefore, it is possible to reduce the possibility that the gap between the first electrode plate 34*a* and the second electrode plate 34*c* at the end portion 31*a* of the battery core 31 cannot be reduced due to the portion of the end portion 31*a* that is not covered by the first cushion portion 41, and it is also possible to reduce the possibility of excessive expansion of the portion of the end portion 31*a* that is not covered by the first cushion portion 41. The end face of the second cushion portion 42 is aligned with the end face 31*b* of the battery core 31, so that the end portion 31*a* disposed opposite to the second cushion portion 42 does not appeared to be suspended, and therefore, it is possible to reduce the possibility that the gap between the first electrode plate 34*a* and the second electrode plate 34*c* at the end portion 31*a* of the battery core 31 cannot be reduced due to the portion of the end portion 31*a* that is not covered by the second cushion portion 42, and it is also possible to reduce the possibility of excessive expansion of the portion of the end portion 31*a* that is not covered by the second cushion portion 42. In another example, the end face of one of the first cushion portion 41 and the second cushion portion 42 is aligned with the end face 31*b* of the battery core 31.

In one embodiment, in the length direction X, the ratio of the length dimension of at least one of the first cushion portion 41 and the second cushion portion 42 to the length dimension of the battery core 31 is 0.06 to 0.15. The first cushion portion 41 and the second cushion portion 42 both have same width dimension with the battery core 31 in the width direction Z of the battery core 31. In this way, the first cushion portion 41 and the second cushion portion 42 can effectively cover the end portion 31*a* of the battery core 31, so as to provide good supporting and buffering effect to the end portion 31*a* of the battery core 31, thereby improving balance of the buffering stress subjected by different regions of the end portion 31*a* of battery core 31.

Figure 11:
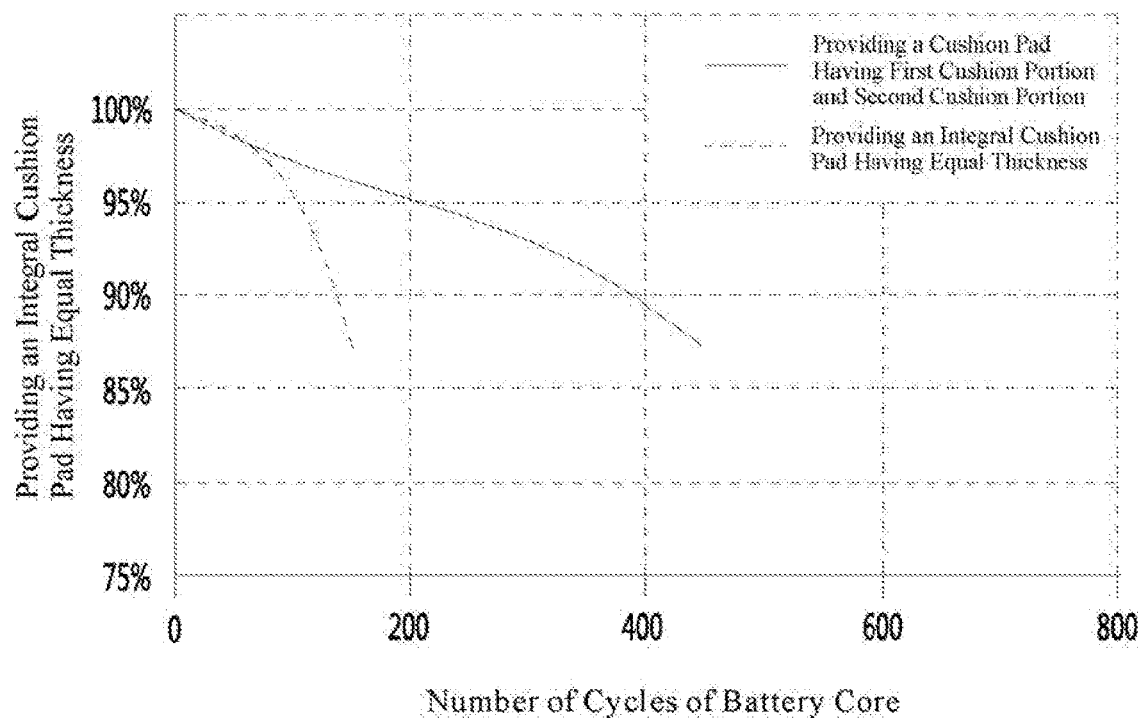
FIG. 11 is a schematic diagram showing the relationship between the number of cycles of the battery unit and the capacity retention rate according to an embodiment of the disclosure; FIG.

Referring to FIG. 11, the abscissa indicates the number of cycles of the battery core 31, and the ordinate indicates the capacity retention ratio of the battery core 31. In the case where an integral cushion pad having equal thickness is disposed between the two battery cores 31 that are close to each other, the capacity retention ratio tends to decrease as the number of cycles increases. In one embodiment, referring to FIG. 10, the cushion pad 40 includes the first cushion portion 41 and the second cushion portion 42. In the direction from the end portions 31*a* of the battery core 31 to the center of the battery core 31, the thickness of the first cushion portion 41 and the thickness of the second cushion portion 42 gradually decrease, and are respectively adapted to match the first gap 32, such that the first cushion portion 41 and the second cushion portion 42 fit the battery cores 31 in the thickness direction Y with no gap. The first cushion portion 41 and the second cushion portion 42 are both structures having non-equal thickness. In the case where the first cushion portion 41 and the second cushion portion 42 are disposed between the two battery cores 31 that are close to each other, the capacity retention ratio also tends to decrease as the number of cycles increases. However, the rate of decrease in the capacity retention ratio when the first cushion portion 41 and the second cushion portion 42 are disposed between the two battery cores 31 that are close to each other, is smaller than the rate of decrease in the capacity retention ratio when the cushion pad having equal thickness is disposed between the two battery cores 31 that are close to each other. When the first cushion portion 41 and the second cushion portion 42 are disposed between the two battery cores 31 that are close to each other, the overall cycle performance of the battery core 31 can be improved.

Figure 12:
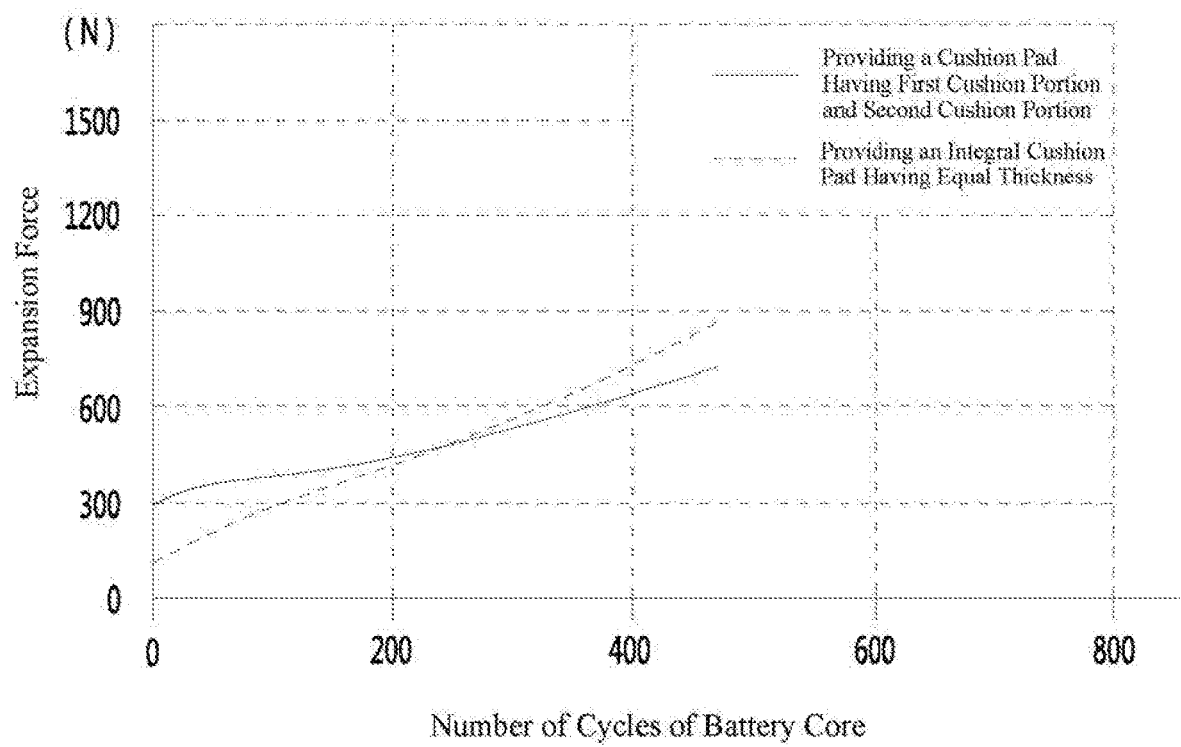
FIG. 12 is a schematic diagram showing the relationship between the number of cycles of the battery unit and the expansion force according to an embodiment of the disclosure.

Referring to FIG. 12, the abscissa indicates the number of cycles of the battery core 31, and the ordinate indicates the expansion force of the battery core 31. In the case where an integral cushion pad having equal thickness is disposed between the two battery cores 31 that are close to each other, the expansion force of each of the battery cores 31 tends to increase as the number of cycles increases. In one embodiment, referring to FIG. 10, the cushion pad 40 includes the first cushion portion 41 and the second cushion portion 42. In the direction from the end portions 31*a* of the battery core 31 to the center of the battery core 31, the thickness of the first cushion portion 41 and the thickness of the second cushion portion 42 gradually decrease, and are respectively adapted to match the first gap 32. The first cushion portion 41 and the second cushion portion 42 are both structures having non-equal thickness. In the case where the first cushion portion 41 and the second cushion portion 42 are disposed between the two battery cores 31 that are close to each other, the expansion force of each of the battery cores 31 also tends to increase as the number of cycles increases. However, the rate of increase in the expansion force of each of the battery cores 31 when the first cushion portion 41 and the second cushion portion 42 are disposed between the two battery cores 31 that are close to each other, is smaller than the rate of increase in the expansion force of each of the battery cores 31 when the cushion pad having equal thickness is disposed between the two battery cores 31 that are close to each other. When the first cushion portion 41 and the second cushion portion 42 are disposed between the two battery cores 31 that are close to each other, the cycle performance can be improved and is better than the cycle performance when the cushion pad having equal thickness is disposed between the two battery cores 31 that are close to each other. By providing the first cushion portion 41 and the second cushion portion 42 between the two battery cores 31 that are close to each other, it is possible to reduce the expansion force of the battery core 31 after the number of cycles reaches a predetermined value.

Figure 13:
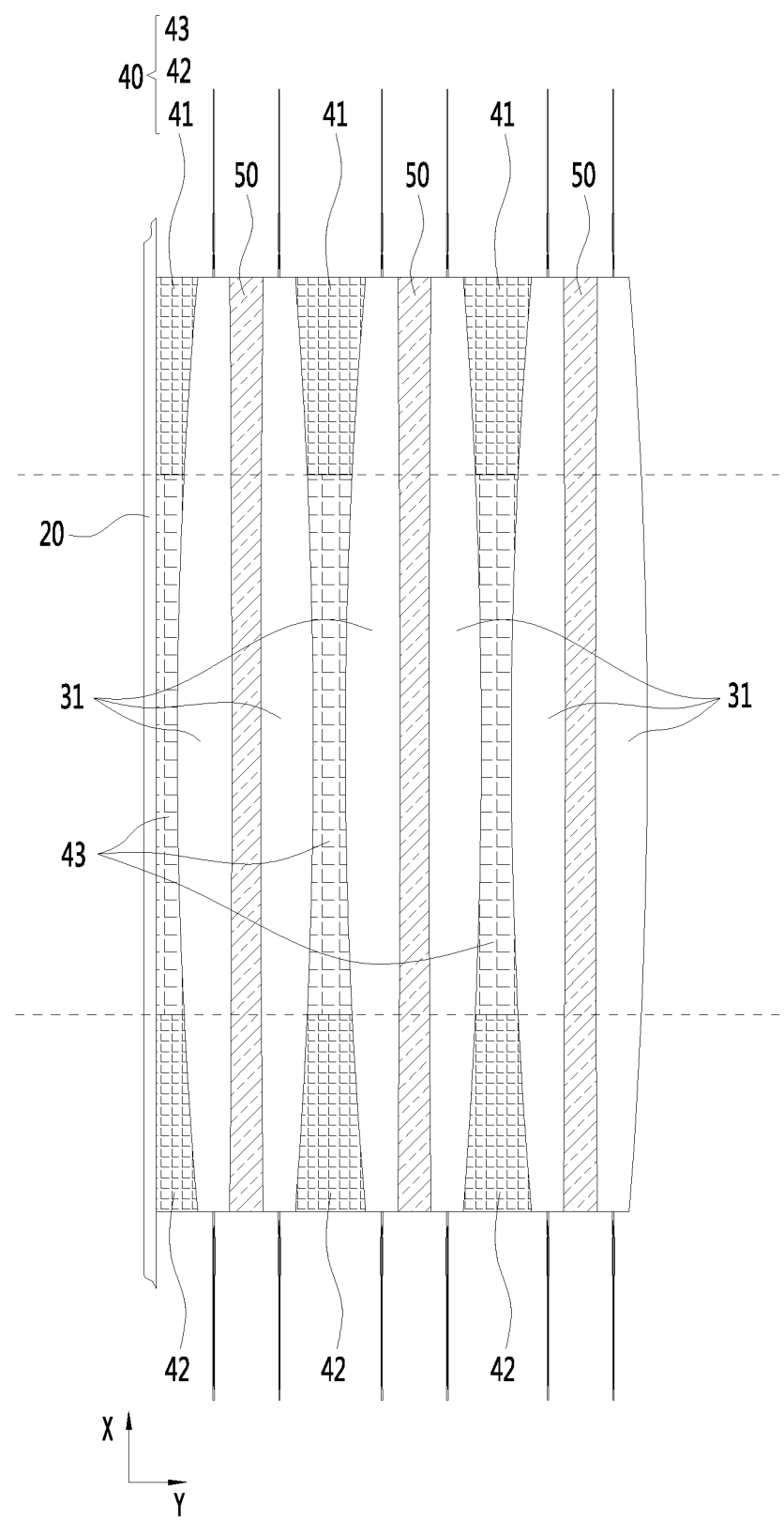
FIG. 13 is a schematic structural view showing a cushion pad disposed between the battery units in a battery module according to another embodiment of the disclosure.
Figure 14:
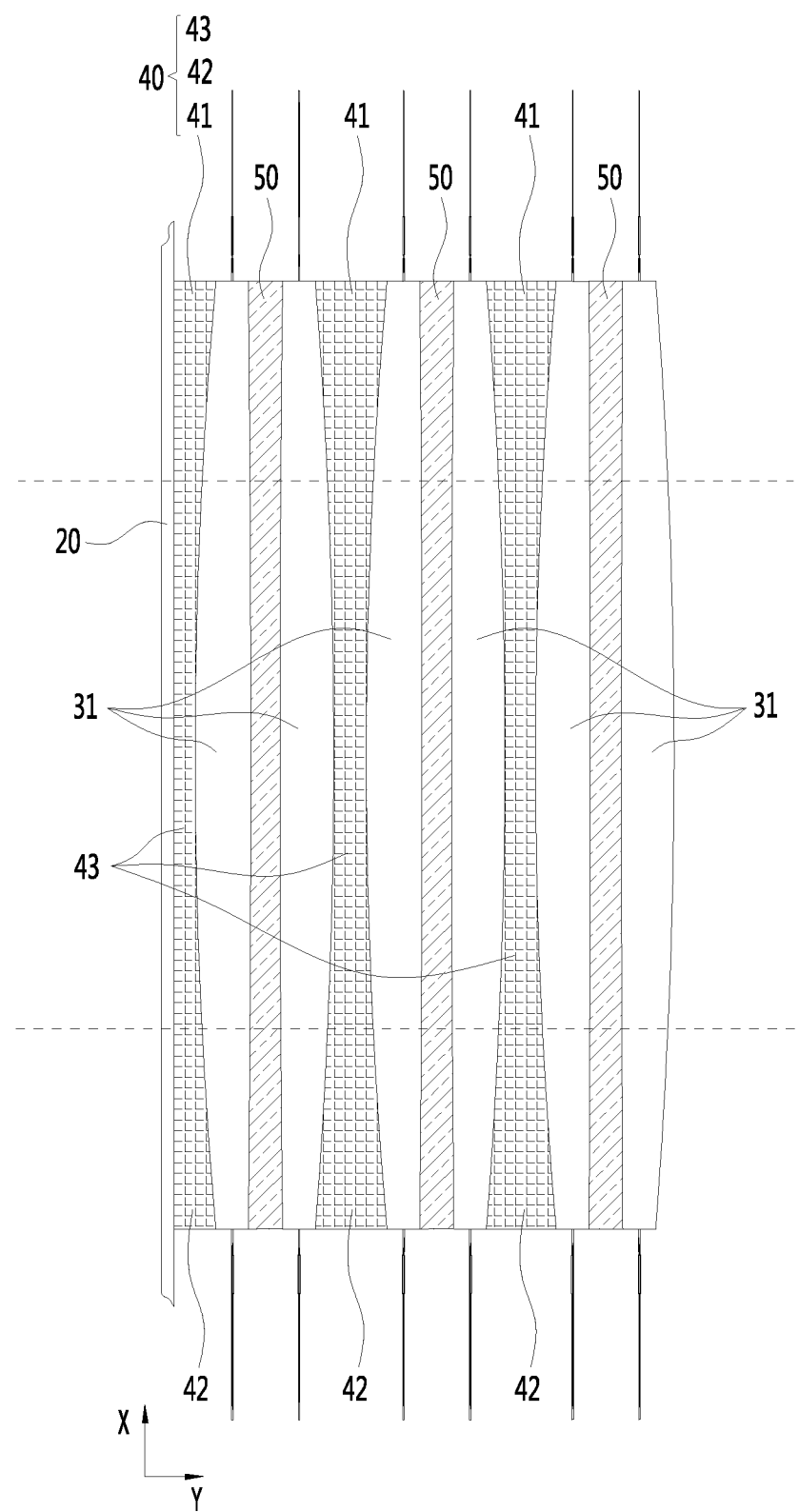
FIG. 14 is a schematic structural view showing a cushion pad disposed between the battery units in a battery module according to still another embodiment of the disclosure.

In one embodiment, referring to FIG. 13 or 14, the cushion pad 40 further includes an intermediate portion 43. The intermediate portion 43 is disposed between the first cushion portion 41 and the second cushion portion 42 and is in contact with the battery core 31. The broken lines in FIGS. 13 and 14 are only used to schematically distinguish the first cushion portion 41, the intermediate portion 43 and the second cushion portion 42, and are not intended to limit the structure of the first cushion portion 41, the intermediate portion 43 and the second cushion portion 42, or other components. When the battery core 31 is expanded during circulation, the first cushion portion 41 and the second cushion portion 42 can play a supporting and buffering effect on the end portions 31a of the battery core 31, and the intermediate portion 43 can play a supporting and buffering effect on the intermediate region of the battery core 31 located between the two end portions 31a. In this way, it is possible to ensure that the force applied onto each region of the entire battery core 31 is more uniform, ensuring that the gap between the first electrode plate 34a and the second electrode plate 34c at the end portions 31a of the battery core 31 tends to coincide with the gap between the first electrode plate 34a and the second electrode plate 34c in the central region of the battery core 31, and ensuring that the degree of expansion of the end portions 31a of the battery core 31 tends to coincide with the degree of expansion of the central region of the battery cores 31, thereby further improving the cycle performance of the battery core 31. The surface of the intermediate portion 43 facing the battery core 31 is shaped to match the surface of the battery core 31. Alternatively, the intermediate portion 43 is a solid structural body.

The respective faces of each of the first cushion portion 41, the second cushion portion 42, and the intermediate portion 43 facing the battery core 31 fit, preferably fully contact the surface of the battery core 31. The respective faces of the first cushion portion 41, the second cushion portion 42, and the intermediate portion 43 are connected with each other and are in smooth transition, thereby reducing the possibility of occurrence of damage in the structure of the battery core 31 due to the stress concentration region on the surface of the battery core 31 applied by the cushion portion. Referring to FIG. 13, the first cushion portion 41, the second cushion portion 42, and the intermediate portion 43 may be of a split structure. Referring to FIG. 14, the first cushion portion 41, the second cushion portion 42, and the intermediate portion 43 may be of an integral structure.

Referring to FIG. 9, a second gap 33 is formed between the battery core 31 in the battery unit 30 adjacent to the housing 20 and the housing 20. In the direction from the end portions 31a of the battery core 31 to the center of the battery core 31, the dimension of the second gap 33 in the thickness direction Y gradually decreases, that is, in the direction from the end portions 31a of the battery core 31 to the center of the battery core 31, the dimension of the second gap 33 in the thickness direction Y is narrowed. The cushion pad 40 is provided in the second gap 33. The cushion pad 40 is in contact with the end portion 31a of the battery core 31. In one example, the second gap 33 penetrates through in the length direction X. Alternatively, as shown in FIG. 10, the cushion pad 40 includes the first cushion portion 41 and the second cushion portion 42. The first cushion portion 41 is disposed between one of the two end portions 31a of the battery core 31 and the housing 20, and the second cushion portion 42 is disposed between the other of the two end portions 31a of the battery core 31 and the housing 20. Both the first cushion portion 41 and the second cushion portion 42 can support the end portions 31a of the battery core 31, and also serve to buffer the expansion deformation of the end portions 31a of the battery core 31, thereby ensuring that the force applied onto each region of the entire battery core 31 adjacent to the housing 20 is more uniform, further improving the cycle performance of the battery core 31. Further, alternatively, referring to FIG. 13 or 14, the cushion pad 40 includes the first cushion portion 41, the intermediate portion 43, and the second cushion portion 42. The intermediate portion 43 is disposed between the first cushion portion 41 and the second cushion portion 42, and therefore, it is possible to ensure that the gap between the first electrode plate 34a and the second electrode plate 34c at the end portion 31a of the battery core 31 tends to coincide with the gap between the first electrode plate 34a and the second electrode plate 34c in the central region of the battery core 31, and it is also possible to ensure that the degree of expansion of the end portion 31a of the battery core 31 tends to coincide with the degree of expansion of the central region of the battery cores 31, thereby further improving the cycle performance of the battery core 31.

In one embodiment, the battery unit 30 includes two or more battery cores 31. The two or more battery cores 31 are disposed within one fixed frame. In one battery unit 30, as shown in FIG. 10, 13, or 14, a rigid isolation member 50 is disposed between the two adjacent battery cores 31. The rigid isolation member 50 may be an aluminum plate. When the battery cores 31 in the battery unit 30 expand, the two adjacent battery cores 31 may be constrained by the rigid isolation member 50. Therefore, on the one hand, the rigid isolation member 50 can form a constraint on the battery core 31 in cooperation with the cushion pad 40 to effectively reduce the expansion deformation of the battery core 31, such that the degree of expansion of the end portion 31a of the battery core 31 tends to coincide with the degree of expansion of the central region of the battery core 31; on the other hand, the rigid isolation member 50 can reduce the possibility of structural damage in the first electrode plate 34a and the second electrode plate 34c caused by the mutual extruding resulting from expansion deformation of the two adjacent battery cores 31. The rigid isolation member 50 may be made of a material having thermal conductivity, so that the heat dissipation of the battery core 31 through the rigid isolation member 50 can be facilitated.

In one embodiment, the number of first gap 32 is two. The two first gaps 32 are formed between the two end portions 31a of the two adjacent battery cores 31, and the central regions of the two adjacent battery cores 31 are in contact with each other such that the two first gaps 32 are not continuous in the length direction X. One cushion pad 40 is disposed in each of the first gaps 32.

Figure 15:
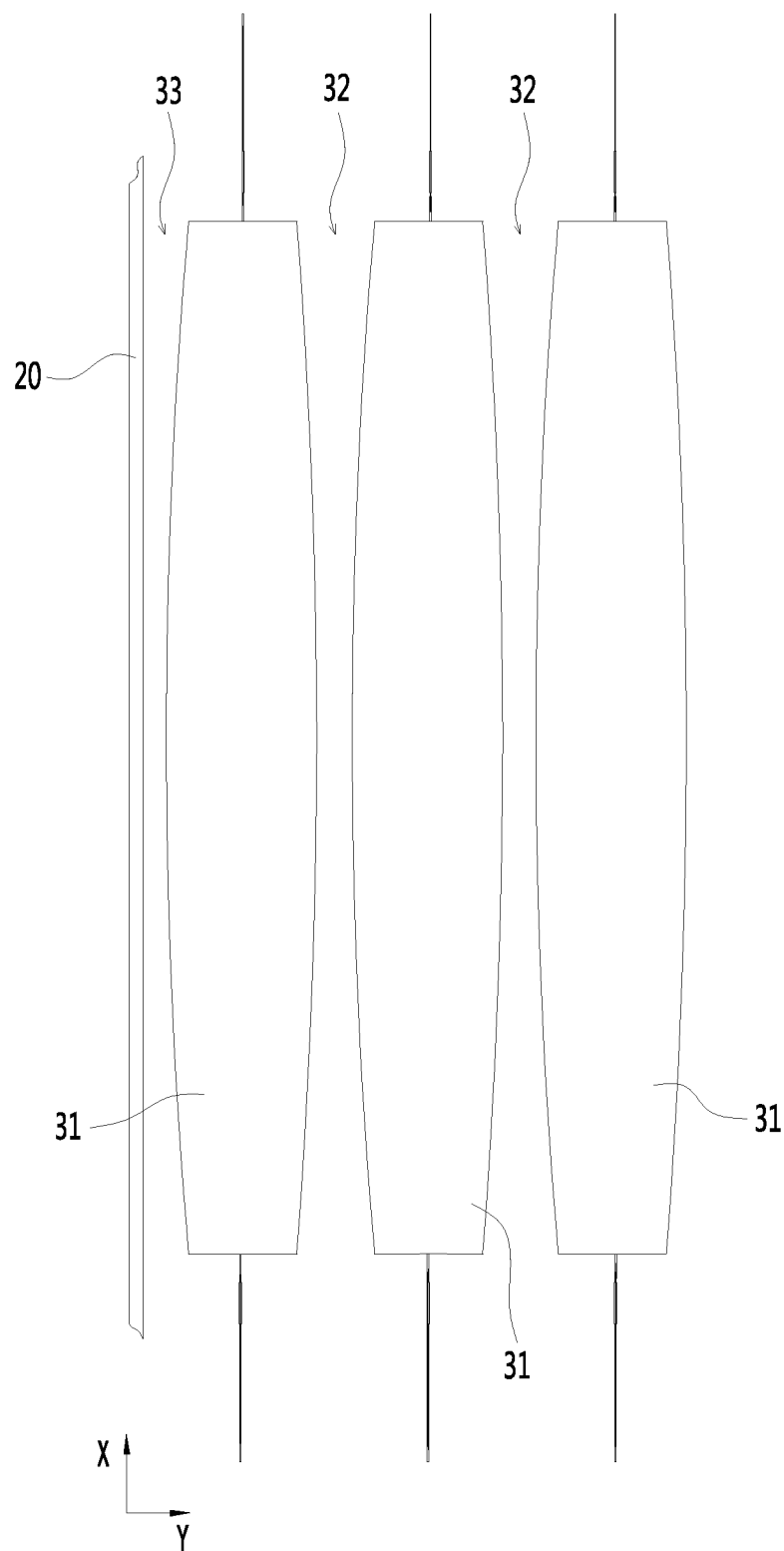
FIG. 15 is a partial schematic view showing arrangement of the battery units in a battery module according to another embodiment of the disclosure.
Figure 16:
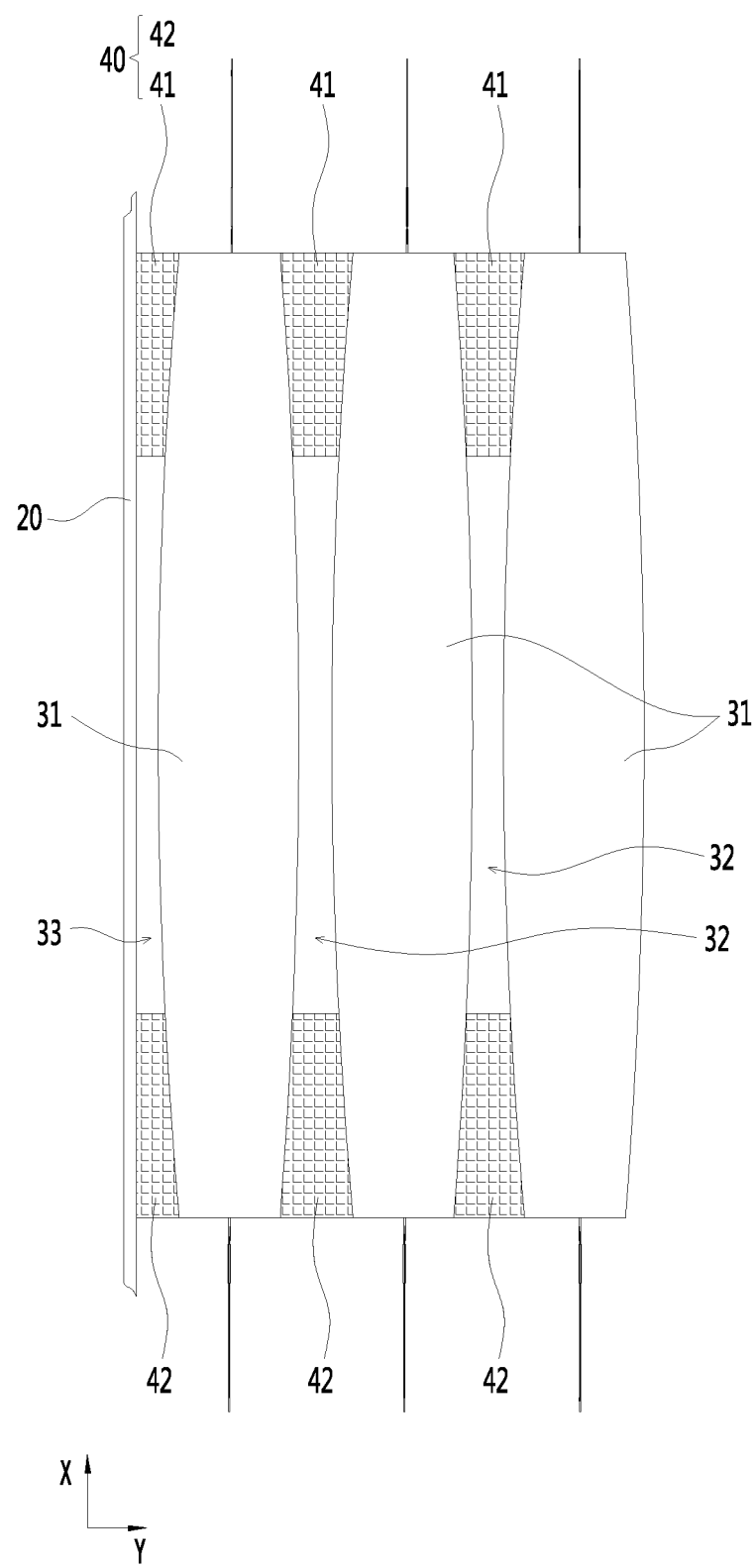
FIG. 16 is a schematic structural view showing a cushion pad disposed between the battery units in a battery module according to still another embodiment of the disclosure.
Figure 17:
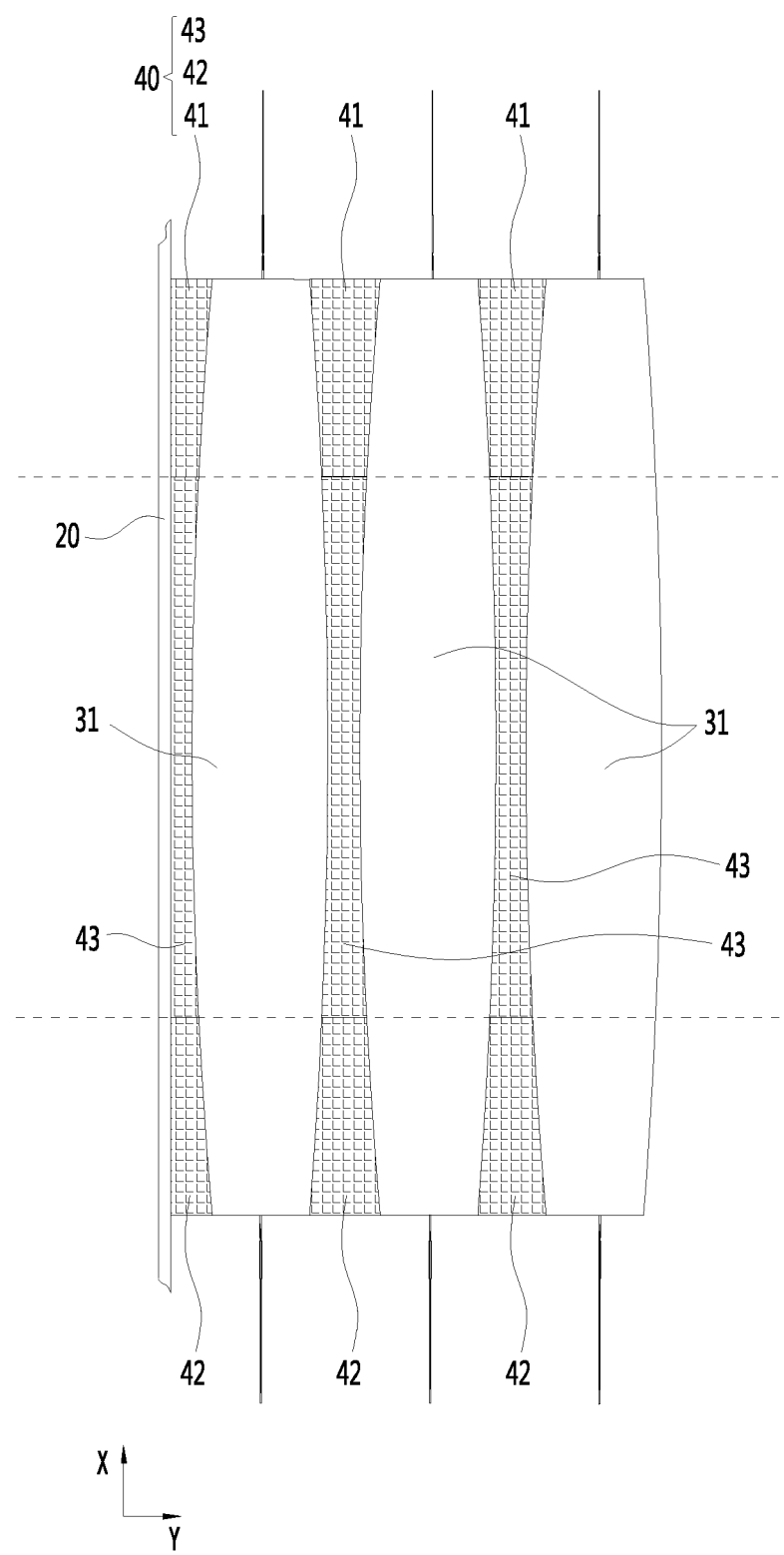
FIG. 17 is a schematic structural view showing a cushion pad disposed between the battery units in a battery module according to still another embodiment of the disclosure.

In one embodiment, referring to FIG. 15, each battery unit 30 includes one battery core 31. Within one fixed frame, one battery core 31 is disposed. The first gap 32 is formed between the two adjacent battery cores 31. The cushion pad 40 is provided between the two adjacent battery cores 31. In one example, referring to FIG. 16, the cushion pad 40 includes a first cushion portion 41 and a second cushion portion 42. The first cushion portion 41 and the second cushion portion 42 are spaced apart in the length direction X. In another example, referring to FIG. 17, the cushion pad 40 further includes an intermediate portion 43. The first cushion portion 41, the intermediate portion 43, and the second cushion portion 42 are sequentially arranged in the length direction X and are connected to each other. The first cushion portion 41, the intermediate portion 43, and the second cushion portion 42 may be of a split structure or an integral structure. The broken lines shown in FIG. 17 are only used to schematically distinguish the first cushion portion 41, the intermediate portion 43, and the second cushion portion 42, and are not intended to limit the structure of the first cushion portion 41, the intermediate portion 43, and the second cushion portion 42 or other components.

Figure 18:
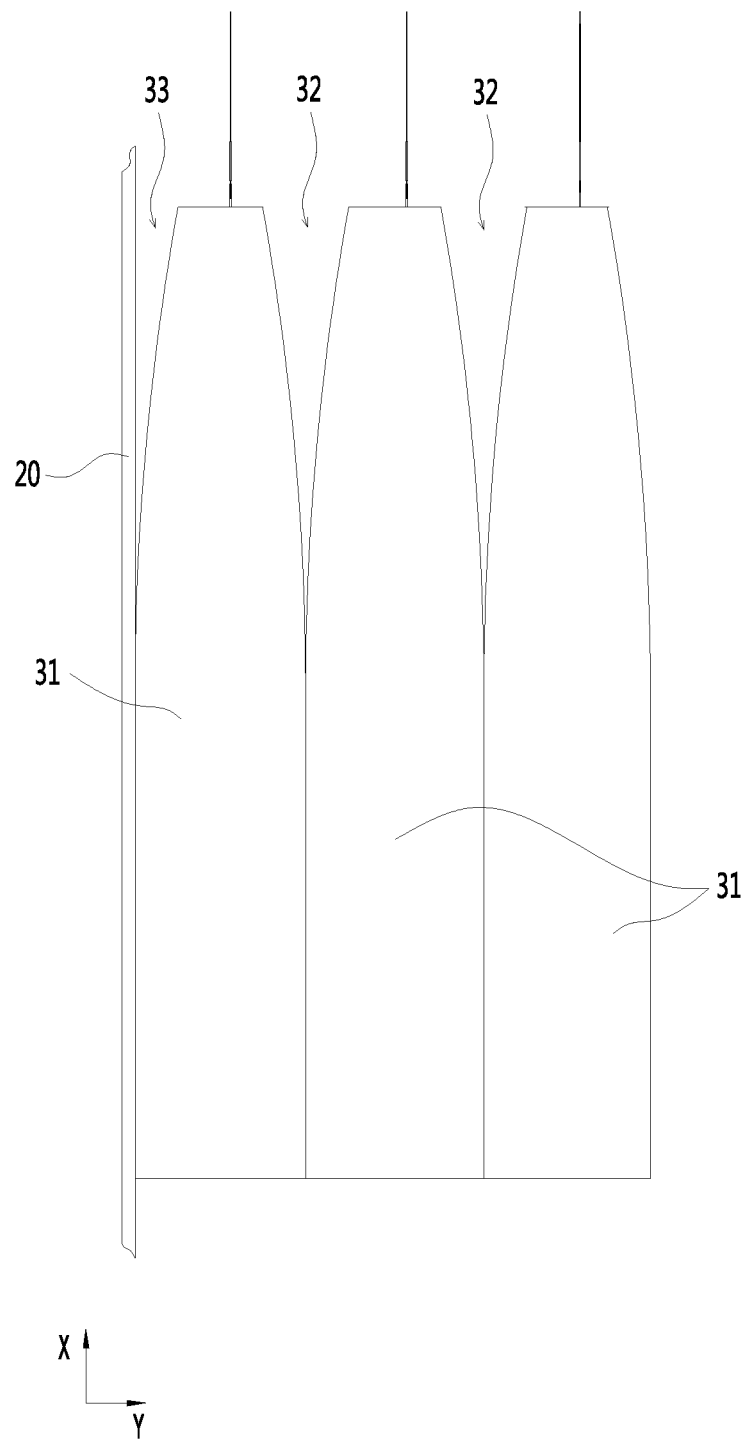
FIG. 18 is a schematic partial view showing arrangement of the battery units in a battery module according to still another embodiment of the disclosure.
Figure 19:
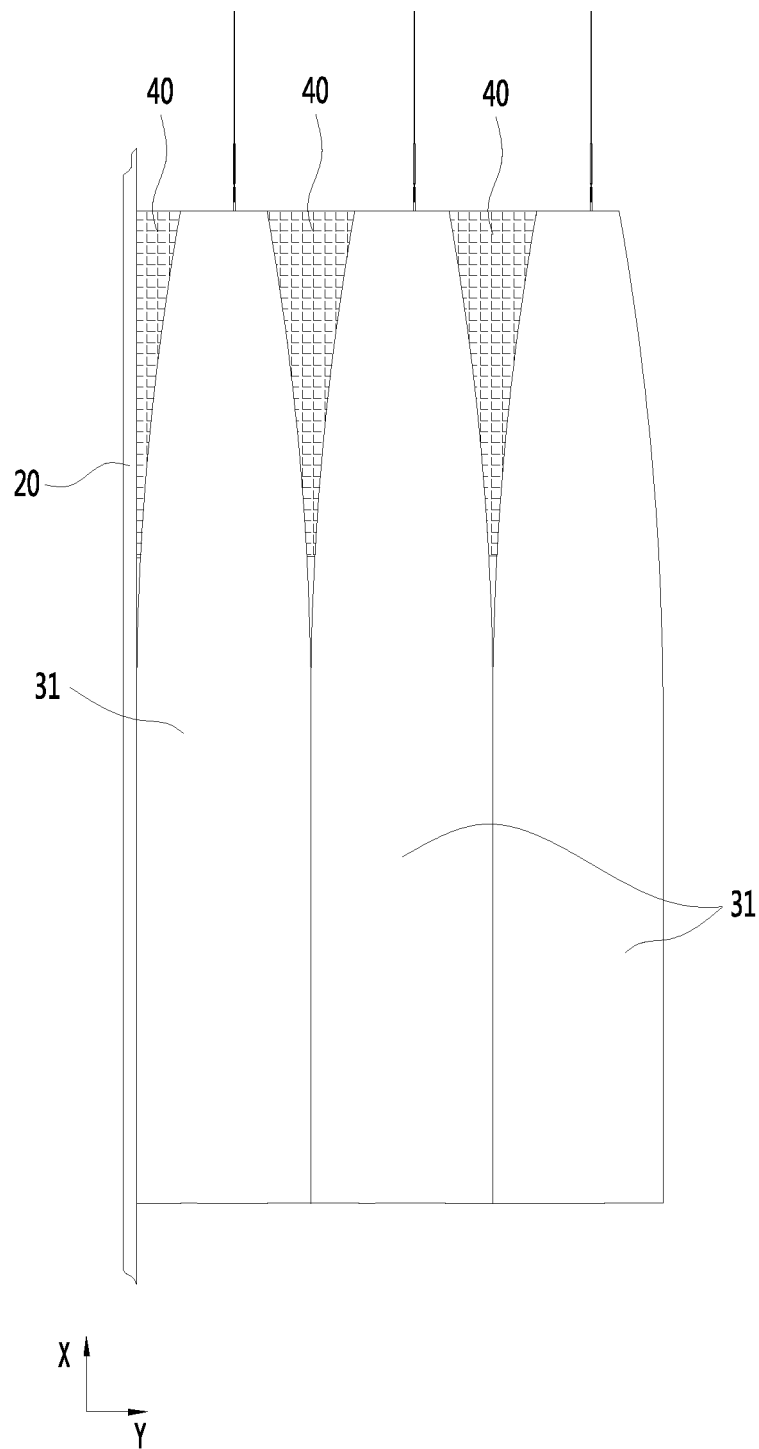
FIG. 19 is a schematic structural view showing a cushion pad disposed between the battery units in a battery module according to still another embodiment of the disclosure.

In one embodiment, as shown in FIGS. 18 and 19, the two tabs are led out from one end face 31b of the battery core 31. The first gap 32 is formed between one end portions 31a of each of the two adjacent battery cores 31, and the other end portions 31a of each of the two adjacent battery cores 31 are in contact with each other. The number of the first gap 32 is one. The first gap 32 does not penetrate through in the length direction X. The cushion pad 40 is disposed in the first gap 32. The cushion pad 40 is in contact with the end portion 31a of the battery core 31

Although the disclosure has been described with reference to the preferred embodiments, various modifications may be made thereto and the components may be replaced with equivalents without departing from the scope of the application. In particular, the technical features mentioned in the various embodiments can be combined in any manner as long as there is no structural conflict. The disclosure is not limited to the specific embodiments disclosed herein, but includes all technical solutions falling within the scope of the claims.

What is claimed is:

1. A battery module, comprising:
   two or more battery units, wherein each of the two or more battery units comprises two or more battery cores with each comprising two end portions opposed in a length direction thereof, each of the two or more battery cores comprises an electrode assembly and a package comprising a receiving space for receiving a main body of the electrode assembly, the main body of the electrode assembly comprises two end portions opposed in a length direction thereof, each of the end portions of the main body of the electrode assembly is thinner than a central region of the main body of the electrode assembly such that each of the end portions of the each of the two or more battery cores is thinner than a central region of the each of the two or more battery cores, and a material of the package is selected from an aluminum plastic film or a steel plastic film; the two or more battery units are arranged side by side in a thickness direction of the each of the two or more battery cores, a first gap is formed between two adjacent battery cores between two different and adjacent battery units of the two or more battery units, the first gap extends from one of the two end portions along the length direction, and in a direction from the two end portions to a center of the each of the two or more battery cores, a size of the first gap along the thickness direction constantly decreases; and
   a cushion pad provided between the two adjacent battery units, wherein the cushion pad is disposed in the first gap and is in contact with the end portions of the each of the two or more battery cores, wherein
   a rigid isolation member made of a thermal conductive material is disposed between two adjacent battery cores in each of the two or more battery units, and the cushion pad is provided between the two adjacent battery cores between the two different and adjacent battery units; and
   the rigid isolation member and the cushion pad are spaced apart from each other in the thickness direction of the battery module, two side surfaces of the rigid isolation member in the thickness direction abut against the two adjacent battery cores in each of the two or more battery units, respectively, and two side surfaces of the cushion pad in the thickness direction abut against the two adjacent battery cores between the two different and adjacent battery units, respectively;
   the rigid isolation member is an aluminum plate, and a material of the cushion pad is selected from silica gel or polyurethane;
   the cushion pad comprises a first cushion portion and a second cushion portion which are spaced apart from each other in the length direction, the first cushion portion is arranged corresponding to one of the two end portions of the each of the two or more battery cores in the length direction, and the second cushion portion is arranged corresponding to other of the two end portions in the length direction;
   two first gaps are formed in a space between the two different and adjacent battery units, central regions of the two adjacent battery cores of the two different and adjacent battery units are in contact with each other, such that the two first gaps are not continuous in the length direction, and the first cushion portion and the second cushion portions are filled in the two first gaps, respectively.

2. The battery module according to claim 1, wherein an end face of the first cushion portion is aligned with an end face of the each of the two or more battery cores in the length direction, and/or, an end face of the second cushion portion is aligned with the end face of the each of the two or more battery cores in the length direction.

3. The battery module according to claim 1, wherein the electrode assembly comprises a first electrode plate and a second electrode plate that have opposite polarities, a thickness of each of the first electrode plate and the second electrode plate constantly increases in the direction from the two end portions to the center of the each of the two or more battery cores.

4. The battery module according to claim 1, wherein
   the battery module further comprises a housing within which the two or more battery units are disposed, a second gap is formed between a battery core of the two or more battery cores adjacent to the housing, in the two or more battery units, and the housing, in the direction from the two end portions to the center of the each of the two or more battery cores, a size of the second gap in the thickness direction constantly decreases, and the cushion pad is disposed in the second gap and is in contact with the end portions of the battery core of the two or more battery cores adjacent to the housing.

5. The battery module according to claim 1, wherein in a width direction of the each of the two or more battery cores, the cushion pad has same size as the each of the two or more battery cores.

6. The battery module according to claim 1, wherein a ratio of a size of at least one of the first cushion portion and the second cushion portion in the length direction to a size of the each of the two or more battery cores in the length direction is 0.06 to 0.15.

* * * * *